United States Patent [19]
Wong et al.

[11] Patent Number: 5,316,524
[45] Date of Patent: May 31, 1994

[54] EDGE GUIDE SYSTEMS FOR BELT TRACKING

[75] Inventors: Chee-Chiu J. Wong, Fairport; Walter J. Sanborn, West Henrietta, both of N.Y.

[73] Assignee: Xerox Corporation, Stamford, N.Y.

[21] Appl. No.: 997,392

[22] Filed: Dec. 28, 1992

[51] Int. Cl.$^5$ .............................................. F16H 7/00
[52] U.S. Cl. ..................................... 474/151; 474/107
[58] Field of Search ....................... 474/102, 106–108, 474/151

[56] References Cited

U.S. PATENT DOCUMENTS

| | | | |
|---|---|---|---|
| 893,690 | 7/1908 | Wood | 474/106 |
| 1,846,665 | 2/1932 | Adams | 474/107 |
| 2,008,318 | 7/1935 | Ziegler | 474/107 |
| 4,068,789 | 1/1978 | Young, Jr. et al. | |
| 4,221,480 | 9/1980 | Spehrley, Jr. | |
| 4,344,693 | 8/1982 | Hamaker | |
| 4,367,031 | 1/1983 | Hamaker | |
| 4,657,370 | 4/1987 | Forbes, II et al. | |

Primary Examiner—Thuy M. Bui
Attorney, Agent, or Firm—Fay, Sharpe, Beall, Fagan, Minnich & McKee

[57] ABSTRACT

An apparatus for controlling the lateral alignment of a belt arranged to move in a predetermined path includes a first roll arranged to support a portion of the belt passing thereover. The first roll has first and second ends. A first centering assembly for the belt is located adjacent the first roll. The first centering assembly includes a first rotating member located adjacent a first end of the first roll and a second rotating member located adjacent a second end of the first roll. The first and second rotating members urge the belt to an equilibrium position on the first roll. In one embodiment, the first and second rotating members are rollers which may either be tapered or crowned. In a second embodiment, the rotating members are driven rollers which rotate towards each other. In a third embodiment, the two rotating members are endless tracking belts which rotate towards each other.

21 Claims, 4 Drawing Sheets

EDGE GUIDE SYSTEMS FOR BELT TRACKING

BACKGROUND OF THE INVENTION

The present invention relates to a belt supporting and tracking apparatus. More particularly, it relates to an improved apparatus for controlling the lateral movement of a belt from its predetermined path.

The invention is particularly suited for use in an electronic device such as an electrostatographic printing machine. However, it should be appreciated that the apparatus could also be used in many other types of machines which utilize a moving belt.

In electrostatographic printing apparatus commonly in use today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ developer which comprises both charged carrier particles and charged toner particles which triboelectrically adhere to the carrier particles. During development, the toner particles are attracted from the carrier particles by the charged pattern of the image areas of the photoconductive insulating area to form a powder image on the photoconductive area. This toner image may be subsequently transferred to a support surface such as copy paper to which it may be permanently affixed by heating or by the application of pressure.

Many commercial applications of the above process employ a photoconductive insulating member in the form of a belt which is supported about a predetermined path past a plurality of processing stations to ultimately form a reproduced image on copy paper. The location of the latent image recorded on the photoconductive belt must be precisely defined in order to have the various processing stations acting thereon optimize copy quality. To this end, it is critical that the lateral alignment of the photoconductive belt be controlled within prescribed tolerances. Only in this manner will a photoconductive belt move through a predetermined path so that the processing stations disposed thereabout will be located precisely relative to the latent image recorded thereon. Lateral movement of the photoconductive belt is particularly a problem in connection with color copiers where the precise tracking of the belt is mandatory for acceptable copy quality.

When considering control of the lateral movement of the belt, it is well known that if the belt were perfectly constructed and entrained about perfectly cylindrical rollers mounted and secured in an exactly parallel relationship with one another, there would be no lateral movement of the belt. In actual practice, however, this is not feasible. Due to the imperfections in the system's geometry, the belt velocity vector is not normal to the roller axis of the rotation, and the belt will move laterally relative to a roller until reaching a kinematically stable position.

Existing methods of controlling the lateral movement of a belt comprise servo systems, crowned rollers and flanged rollers. Servo systems use steering rollers to maintain lateral control of the belt. While they generally apply less stress to the sides of the belt than do crowned rollers and flanged rollers, servo systems are frequently rather complex and costly. Crowned and flanged rollers while being inexpensive, frequently produce high local stresses resulting in damage to the edges of the belt.

Accordingly, it has been considered desirable to develop a new and improved edge guide system for belt tracking which would overcome the foregoing difficulties and others while providing better and more advantageous overall results.

BRIEF SUMMARY OF THE INVENTION

In accordance with the present invention, a new and improved apparatus is provided for controlling the lateral alignment of a belt arranged to move in a predetermined path.

More particularly, in accordance with this aspect of the invention, the apparatus comprises a first roll arranged to support a portion of the belt passing thereover, the first roll having first and second ends. A first centering assembly for the belt is located adjacent the first roll. The first centering assembly comprises a first rotating member located adjacent a first end of the first roll and a second rotating member located adjacent the second end of the first roll. The first and second rotating members urge the belt to an equilibrium position on the first roll.

According to a further aspect of the present invention, the first and second rotating members comprise rollers and the first centering assembly further comprises a means for rotating the first and second rollers toward each other. Alternatively, the first and second rotating members can each comprise an endless tracking belt and a roll arranged to support a portion of the tracking belt passing thereover.

In another embodiment, the first and second rotating members can comprise a first tapered roller located adjacent a first end of a first roll and a first resilient means for biasing the first roller in relation to the first roll. A second tapered roller is located adjacent a second end of the first roll and a second resilient means biases the second roller in relation to the first roll.

In a still further aspect of the invention, the apparatus can also comprise a second roll spaced from the first roll and arranged to support a portion of the belt passing thereover with the second roll having first and second ends. A second centering assembly is located adjacent the second roll. The second centering assembly comprises a third rotating member located adjacent the first end of the second roll and a fourth rotating member located adjacent the second end of the second roll. The third and fourth rotating members urge the belt to an equilibrium position on the second roll.

One advantage of the present invention is the provision of a new and improved edge guide system for maintaining the lateral alignment of a moving belt.

Another advantage of the present invention is the provision of an edge guide system for an endless belt which guide system avoids the need for using an active control means such as a conventional servo system since these are generally complex and costly.

Still another advantage of the present invention is the provision of an edge guide system for a photoconductive belt which avoids the high local stresses that are put on the highly sensitive photoconductive belt by conventional passive edge guide systems such as flanged rolls and crowned rolls.

Yet another advantage of the present invention is the provision of an edge guide system which employs a pair of tapered rollers, located adjacent the two ends of a belt-supporting roll, for maintaining a moving belt in lateral alignment in relation to the roll.

Still yet another advantage of the present invention is the provision of an edge guide system which employs a pair of rollers located adjacent the side edges of a moving endless belt. Further provided is a means for rotating the first and second rollers toward each other in order to maintain the moving belt in lateral alignment.

An additional advantage of the present invention is the provision of an edge guide system for belt tracking which employs a pair of endless tracking belts located adjacent the side edges of a moving endless belt. Each of the tracking belts has a portion which is supported by a roll. The two tracking belts rotate toward each other and maintain the moving belt in lateral alignment on a belt-supporting system.

A further advantage of the present invention is the provision of an edge guide system for belt tracking which employs first and second belt-supporting rolls spaced from each other with each such roll supporting a portion of an endless belt passing thereover and first and second centering assemblies located adjacent, respectively, the first and second rolls. Each of the centering assemblies includes a first rotating member located adjacent a first end of its respective roll and a second rotating member located adjacent a second end of its respective roll.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts several embodiments of which will be described in detail in the specification and illustrated in the accompanying drawings which form a part hereof and wherein.

DETAILED DESCRIPTION OF THE INVENTION

Figure 1:
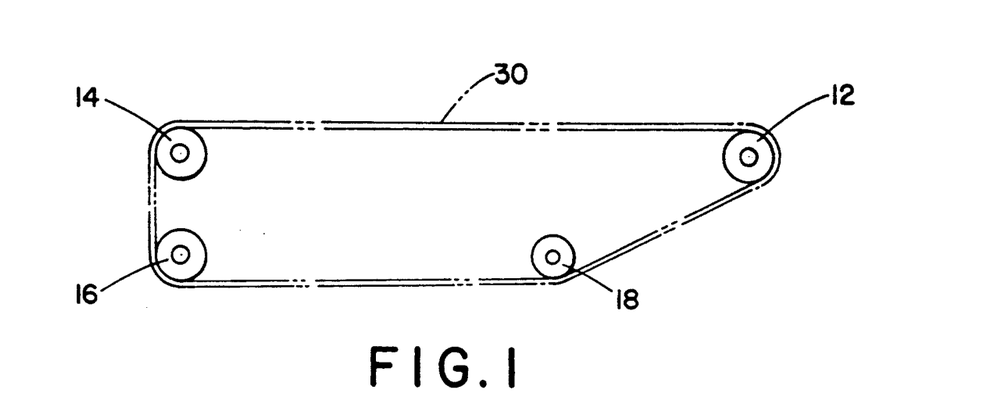
FIG. 1 is a schematic side elevational view of a photoreceptor belt of an electrostatographic reproducing machine utilizing the edge guide system of the present invention for belt tracking.

Referring now to the drawings, which are for the purpose of illustrating several embodiments of the invention only and not for the purpose of limiting same, FIG. 1 is a schematic representation of a typical photoreceptor belt system as used on an electrostatographic machine such as a photocopier. While the edge guide system will hereinafter be described in connection with a photocopier, it should be appreciated that the edge guide system can be used also in a variety of other environments in which it is important that the lateral alignment of an endless belt be controlled as it moves over one or more rolls.

Figure 2:
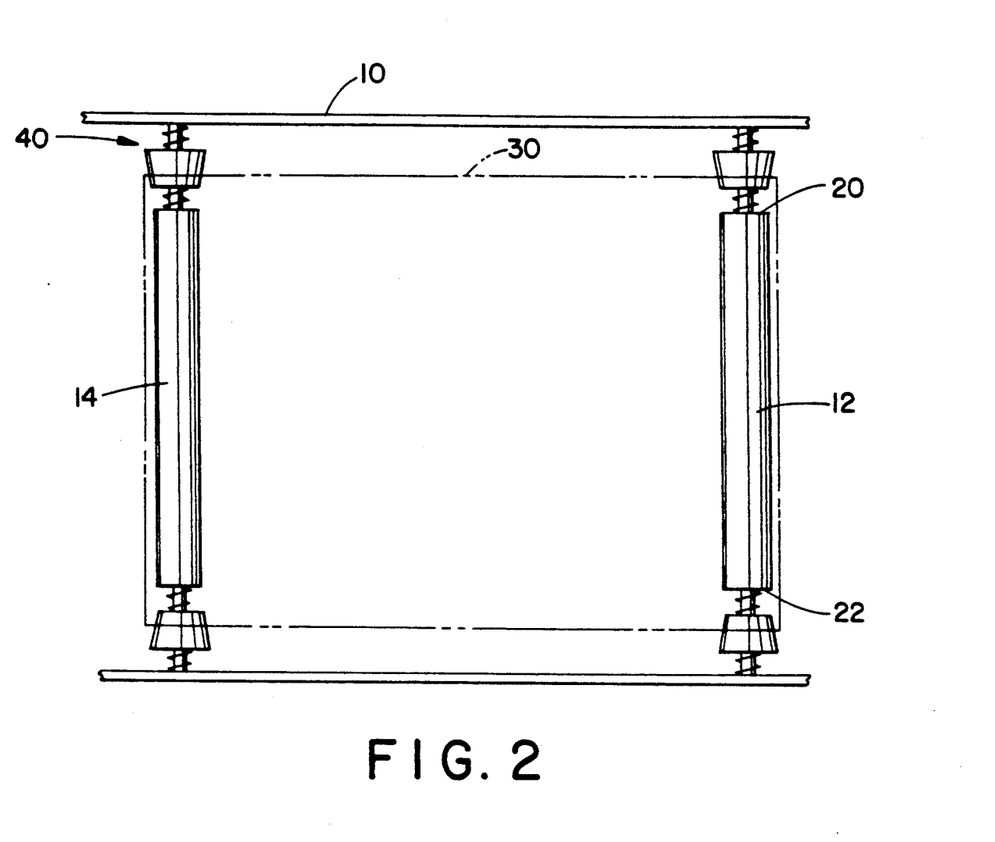
FIG. 2 is a top plan view of the apparatus of FIG. 1.

With reference now to FIG. 2, a photocopier typically comprises a frame 10, a drive roll 12 and a first idler roll 14. As shown in FIG. 1, the system further comprises a second idler roll 16 and a follower 18. Each of the rolls 12, 14 and 16 include first and second ends 20 and 22. As is well known, a photoreceptor belt 30 is entrained around the several rolls 12, 14, 16 and 18.

An edge guide system 40 is provided adjacent each side edge 20 and 22 of e.g. the drive roll 12 and idler roll 14 as is illustrated in FIG. 2. While the number of rolls utilizing such edge guide systems 40 may vary, generally speaking, three major rolls would utilize the edge guide system, namely the drive roll 12 and the first and second idler rolls 14 and 16. That is, the typical photoreceptor belt system usually consists of these three key rolls. The rest of the rolls are standard tubular rolls termed followers.

Figure 3:
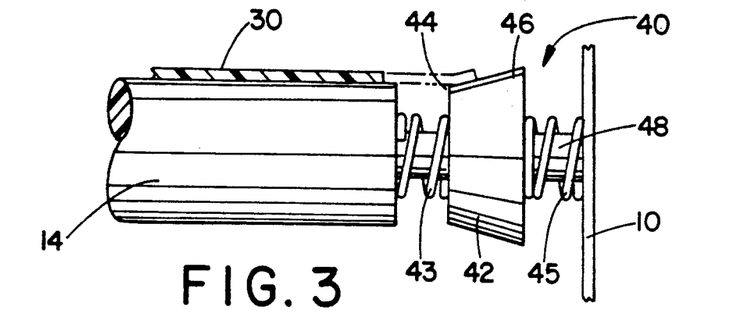
FIG. 3 is an enlarged partially broken away side elevational view of a right edge of a roll of FIG. 2 utilizing the edge guide system according to a first embodiment of the present invention.

With reference now to FIG. 3, the edge guide system 40 can comprise a tapered roller 42 and a resilient means for biasing the roller 42 in relationship to the roll 14 as well as the side frame 10. In the embodiment of FIG. 3, the resilient means comprises a first spring 43 located between the roll 14 and a first side edge 44 of the roller 42 and a second spring 45 located between a second side edge 46 of the roller 42 and the frame 10. The roller 42 and the first and second springs 43 and 45 are all mounted on a suitable shaft 48 on which the roll 14 is journaled as is conventionally known. As is evident, the roll 42 is tapered such that its first side edge 44 has a smaller circumference than does the second side edge 46. In other words, the roll 42 is tapered towards the roll 14. The taper is such that the circumference of the roller first edge 44 is smaller than the circumference of the roller 14 whereas the circumference of the roller second edge 46 is larger than the circumference of the roll 14. This is evident from FIG. 3 of the drawings.

While only the edge guide system 40 located on the right end of the first idler roll 14 is illustrated and described, it should be appreciated that the identical system, albeit with the roller 42 being tapered in the opposite direction, is also provided on the second end of the idler roll. Identical edge guide systems are provided on the two ends of the drive roll 12 as shown in FIG. 2.

Moreover, identical edge guide systems are provided on the two ends of the second idler roll 16.

During operation, the spring force of the two springs 43 and 45 will act on the photoreceptor belt 30 through the rollers 42 so that an equilibrium position of the photoreceptor belt will be achieved. That is, when the photoreceptor belt 30 attempts to slide off the roll 14 so that a side edge thereof contacts the roller 42, the roller, due to its taper, will urge the photoreceptor belt back onto the roll 14 because the belt will resist being stretched as it slides onto the roller. In the meanwhile, the two springs 43 and 45 will help balance the location of the roller 42 in relationship to the roll 14 and the frame 10 of the machine.

The rollers 42 must be tapered, wear resistant and provide good traction. In a prototype of the edge guide system of the present invention, a polyurethane roller was utilized for testing the apparatus. That roller had a taper of 7¼° such that its first or inner edge 44 had a diameter of 0.90 inches (2.29 cm.) and its second or outer edge had a diameter of 1.10 inches (2.79 cm.), while the roll 14 had a diameter of 1.0 inches (2.54 cm.). The roller 42 was 3/4 inches (1.91 cm.) wide. This particular roller had a hardness of 60 durometer on the Shore A measuring scale. When a roller of this type was utilized together with a pair of conventional resilient springs such as springs 43 and 45 illustrated in FIG. 3, in a test fixture, acceptable results were obtained. More specifically, at a belt speed of 25 cm/second (10 inch-/second) tracking accuracy was as good as plus or minus 0.1 mm. At a belt speed of 50 cm/second (20 inch/sec.) the tracking accuracy was plus or minus 0.15 mm. These figures may be acceptable for certain color copiers. The speed ranges mentioned correspond to mid volume and high volume engines, respectively.

In order for the roller to exhibit good wear resistance and good traction, the roller material must be matched to the material of the photoreceptor belt. Normally, such belts are made of an elastomer material and a polyurethane roller material has proven adequate for this purpose. The roller must exhibit a reasonable coefficient of friction in relationship to the belt so that optimum belt control can be achieved. While the roller 42 is illustrated in, e.g., FIG. 4 as being made from an elastomer material, it should be appreciated that a metal roller having an elastomer coating may also be adequate for this purpose.

The springs 43 and 45 are advantageous in that they provide resiliency to the system. The springs resiliently bias the roller 42 relative to the idler roll 14 and the frame 10. It should be appreciated, however, that other types of resilient biasing means than the springs 43 and 45 illustrated in FIG. 3 could be provided.

Figure 4:
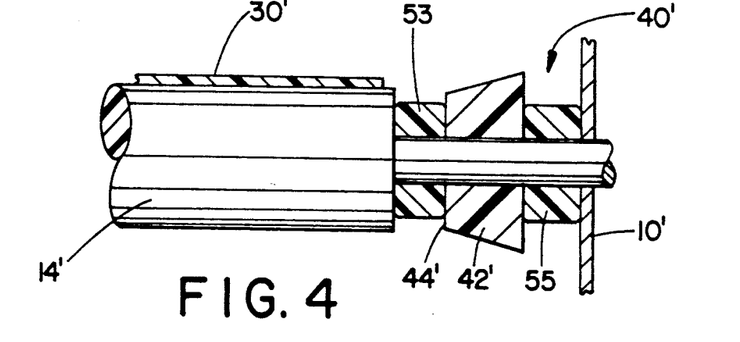
FIG. 4 illustrates the roll of FIG. 3 when used with an edge guide system according to a second embodiment of the present invention.

In that regard, attention is now directed to FIG. 4. Like components in FIG. 4 are identified by like numerals with a primed suffix (') and new components therein are identified by new numerals.

In this figure, a roll 14' is mounted on a housing 10'. A belt 30' is supported by the roll 14'. Positioned between an end of the roll 14' and the housing 10' is a first biasing means 53, a roll 42' and a second biasing means 55. The two biasing means in this embodiment are spacers made of a suitable elastomer material such as a foam material, rubber, urethane or the like. It is noted that the outer diameter of the two spacers 53 and 55 is smaller than the minimum diameter at a first edge 44' of the tapered roller 42'. The operation of the edge guide system 40' of this embodiment is identical to the operation of the embodiment illustrated in FIG. 3.

While the tapered roller 42 is illustrated in FIG. 3 as being so oriented that it tapers towards the roll 14, there is no proof that the roller would not work if it were reversed in relationship to the roll. In that connection, attention is directed to FIG. 5 wherein like components are identified by like numerals with a double primed suffix (″) and new components are identified by new numerals.

In this embodiment, a roll 14″ is spaced from a housing 10″ by an edge guide system 40″ comprising first and second springs 63 and 65 and a roller 62. This roller includes a small diameter end 64 and a large diameter end 66. Unlike the embodiment of FIG. 3, however, in FIG. 5 the large diameter end 66 of the roller is located adjacent the end of the roll 14″ and the small diameter end 64 is facing away from the roll.

Figure 5:
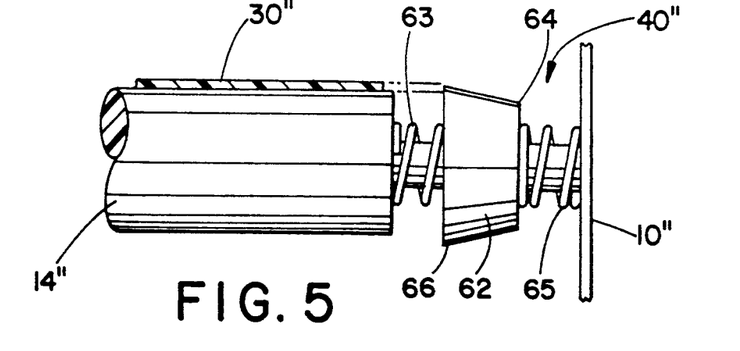
FIG. 5 illustrates the roll of FIG. 3 when used with an edge guide system according to a third embodiment of the present invention.

Rather than using tapered rollers as illustrated in FIGS. 3-5, one could also utilize a crowned roller. In this regard, attention is directed to FIG. 6 wherein like components are identified by like numerals with a triple primed suffix (‴) and new components are identified by new numerals.

Figure 6:
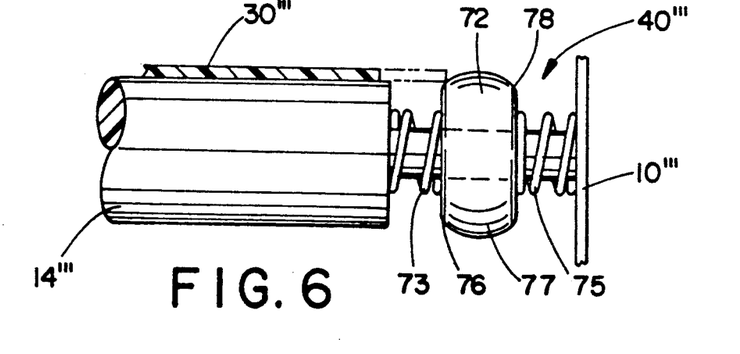
FIG. 6 illustrates the roll of FIG. 3 when used with an edge guide system according to a fourth embodiment of the present invention.

In this figure, a roll 14‴ is spaced from a housing 10‴ by an edge guide system 40‴. The edge guide system comprises a crowned roller 72, a first spring 73 which is located between the crowned roller and the roll 14‴ and a second spring 75 which is located between the crowned roller and the housing 10‴.

The crowned roller 72 is so sized that it has a diameter at an inner edge 76 which is smaller than the diameter of the roll 14‴ and a diameter at its center 77 which is larger than that of the roll. The diameter of the roll 72 at its second edge 78 may be identical with the diameter at its first edge 76 or may be different, as desired. For example, assuming that the drive roll has a diameter of 1.0 inches, (2.54 cm.) the crowned roller 72 can have a minimum diameter at its inner edge 76 of 0.95 inches (2.41 cm.) and a maximum diameter at its center 77 of approximately 1.1 inches (2.79 cm.). In this way, the belt 30‴ if it walks away from the roll 14‴ will be urged by the crowned section of the roller 72 back onto the roll 14‴. The thickness of the crowned roller 72 can be on the order of 1 to 1½ inches (2.54–3.81 cm.) if desired.

All of the embodiments thus far illustrated disclose the use of a belt edge aligning system which comprises a tapering or crowned roller. It should be appreciated, however, that other ways of centering the belt on its several rolls can be employed.

Figure 7:
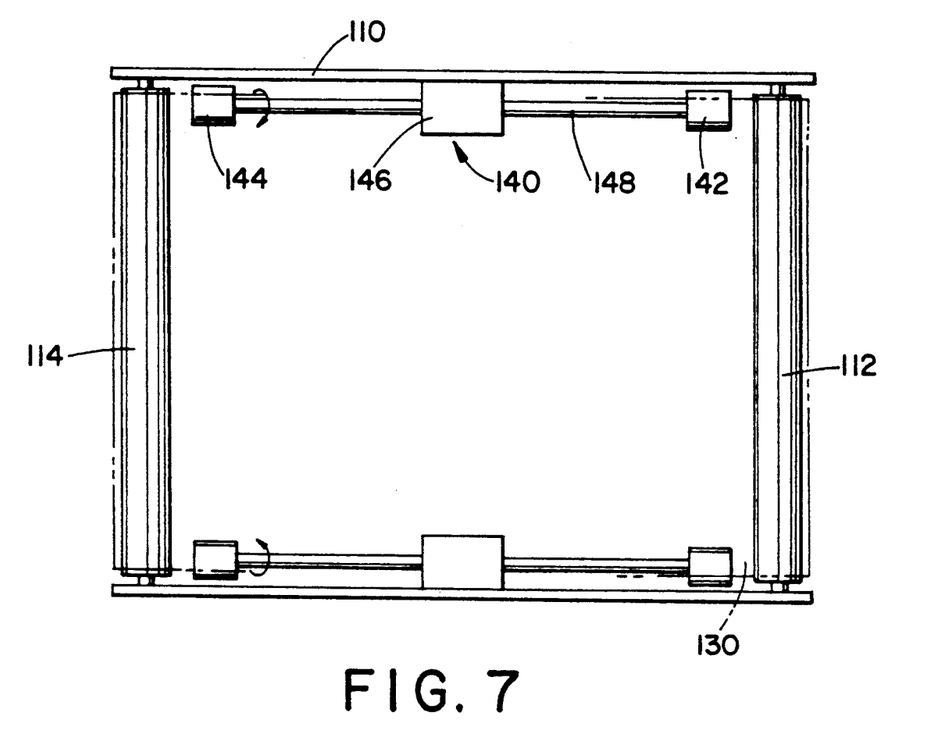
FIG. 7 is a schematic top plan view of a photoreceptor belt of an electrostatographic reproducing machine illustrating a fifth embodiment of the present invention.
Figure 8:
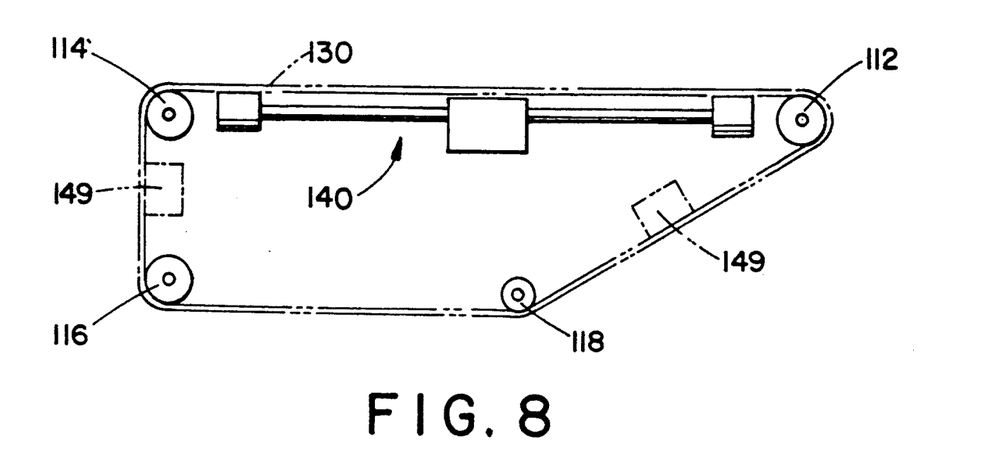
FIG. 8 is a side elevational view of the system of FIG. 7.

With reference now to FIGS. 7 and 8, a different means for centering the belt on the rolls is there illustrated. In these figures, a frame 110 is shown as holding a plurality of spaced rolls 112, 114, 116 and 118. The rolls support a photoreceptor belt 130. In order to center the photoreceptor belt on the several rolls, there is provided an edge guide system 140 along each side edge of the belt. Because the edge guide systems are identical, only one will be described herein, it being appreciated that the other system is identical. In this embodiment, the edge guide system comprises a pair of spaced rollers 142 and 144 that are positioned adjacent the side edges of at least two of the rolls. These rollers 142 and 144 can be driven by a centrally located motor 146 through the use of a pair of drive shafts 148 as is best illustrated in FIG. 7. Alternatively, separate motors can be used to drive each roller or belts or gears can be used to drive the rollers.

While only two such edge guide systems 140 are shown in FIG. 7, more such rollers 149 can be utilized as shown in FIG. 8 if desired in order to very accurately position the belt 130 on the several rolls should that be considered necessary for a particular application. The additional rollers 149 can be driven by any suitable means. These are not illustrated in FIG. 8 for the sake of simplicity.

It should be appreciated that the rollers on the two side edges of the belt 130 rotate toward each other (as shown by arrows in FIG. 7) thereby creating a centering driving force keeping the belt at an equilibrium position at all times. All the rollers 142, 144, 149 can be made of any suitable conventional material which provides good traction and wear resistance as explained above with regard to the tapered roller of FIG. 3.

Figure 9:
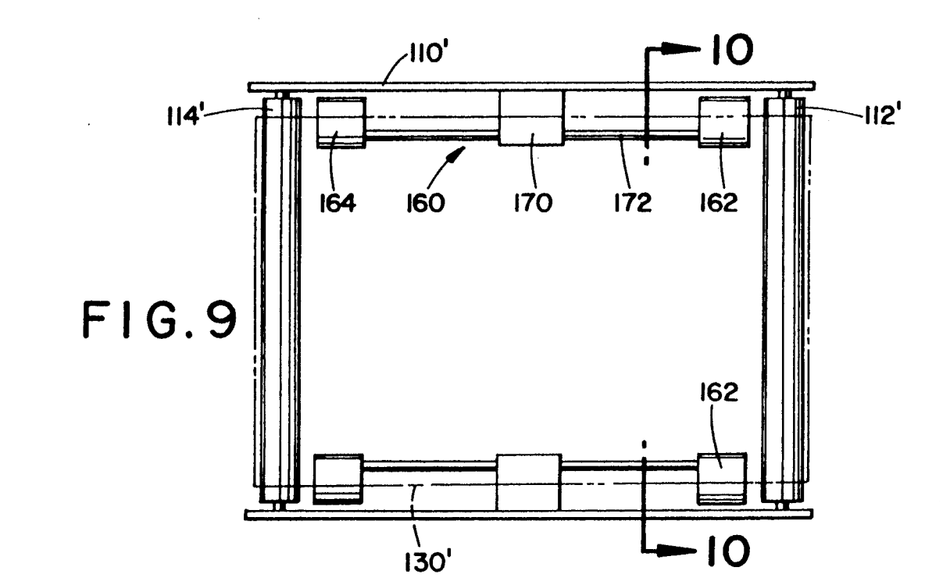
FIG. 9 is a schematic top plan view of a photoreceptor belt of an electrostatographic reproducing machine illustrating a seventh embodiment of the present invention.
Figure 10:
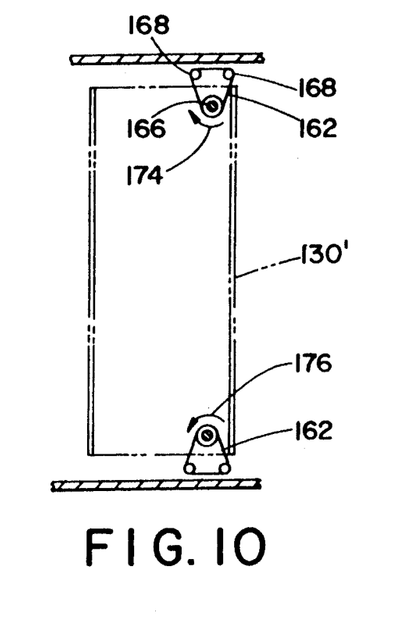
FIG. 10 is a cross sectional view along line 10—10 of the system of FIG. 9; and, FIG. 11 is a side elevational view of the system of FIG. 9.
Figure 11:
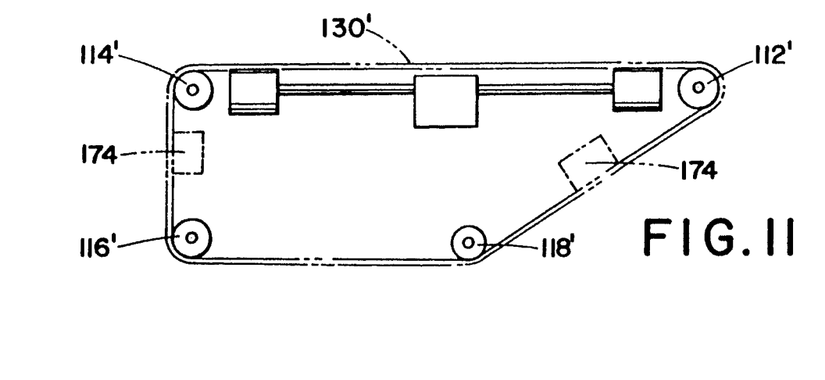

A third configuration of an edge guide system is illustrated in FIGS. 9–11. For ease of comprehension and appreciation of this design, like components will be identified by like numerals with a primed suffix (') and new components will be identified by new numerals.

FIGS. 9 and 10 illustrate a frame 110' on which are mounted a plurality of rolls 112', 114', 116' and 118'. A photoreceptor belt 130' is supported by the several rolls. Also provided is an edge guide system 160 which is positioned along both side edges of the photoreceptor belt 130' as shown in FIG. 9. Since the two edge guide systems are identical, only one of these will be described, it being appreciated that the other edge guide system functions in the same manner.

The edge guide system 160 comprises a pair of belts 162 and 164. As illustrated in FIG. 10, these belts are entrained around a belt drive roll 166 and a pair of spaced idler rolls 168. As so entrained, the belt 162 assumes a somewhat tapered orientation in relationship to the photoreceptor belt 130'. It should be appreciated that the three rolls 166, 168, 169 are mounted on a suitable frame (not illustrated) which is secured to the housing 110'.

The drive roll 166 can be driven by any suitable means. One example is shown in FIGS. 9 and 10 where a suitable motor 170 drives the roll 166 through a pair of drive shafts 172. As shown by the arrows 174 and 176, the two belts 162 rotate towards each other with the upper surface of each belt 162 contacting a bottom surface of the photoreceptor belt 130'. This keeps the photoreceptor belt at an equilibrium position on the several rolls 112', 114', 116' and 118'. While in FIG. 9 only two such edge guide systems 160 are illustrated such that the rollers 162 and 164 are located adjacent the drive roll 112' and the first idler roll 114', it is evident from FIG. 11 that additional such rolls 174 can also be employed if that is considered necessary for a particular environment.

While in the several embodiments illustrated in the drawings, the same type of centering assembly was utilized for all the rolls, it should be appreciated that any combination of centering assemblies or edge guide systems, as illustrated in FIGS. 1–11, may be mixed and matched as may be considered necessary for a particular environment. It is to be noted that all of the edge guide systems illustrated herein provide guidance for the side edges of the photoreceptor belt but do not necessitate the use of pivoting linkages to pivot one of the idler rolls or the drive roll in order to center the belt on the rolls.

The invention has been described with reference to the various embodiments. Obviously, modifications and alterations will occur to others upon the reading and understanding of the specification. It is intended to include all such modifications and alterations insofar as they come within the scope of the appended claims or the equivalents thereof.

We claim:

1. An apparatus for controlling the lateral alignment of a belt arranged to move in a predetermined path, comprising:
   a first roll arranged to support a portion of the belt passing thereover, said first roll having first and second ends;
   a frame to which said first roll is mounted; and,
   a first centering assembly for the belt, said first centering assembly being located adjacent said first roll, said first centering assembly comprising:
      a first rotating member located adjacent said first end of said first roll,
      a first resilient member located between said first rotating member and said frame,
      a second resilient member located between said first rotating member and said frame,
      a second rotating member located adjacent said second end of said first roll,
      a third resilient member located between said first roll and said second rotating member, and
      a fourth resilient member located between said second rotating member and said frame, wherein said first and second rotating members urge the belt to an equilibrium position on said first roll.

2. The apparatus of claim 1 wherein said first rotating member includes a larger diameter end and a smaller diameter end and wherein said resilient means comprises:
   a first resilient spacer located adjacent said larger diameter end of said first rotating member; and,
   a second resilient spacer located adjacent said smaller diameter end of said first rotating member.

3. The apparatus of claim 1 wherein said first and second rotating members respectively comprise:
   a first tapered roller located adjacent a first end of said first roll, said first roller tapering toward said first roll; and,
   a second tapered roller located adjacent a second end of said first roll, said second roller tapering toward said first roll.

4. The apparatus of claim 1 further comprising:
   a second roll, spaced from said first roll, arranged to support a portion of the belt passing thereover, said second roll having first and second ends;
   a second centering assembly located adjacent said second roll, said second centering assembly comprising:
      a third rotating member located adjacent said first end of said second roll,
      a fourth rotating member located adjacent said second end of said second roll wherein said third and fourth rotating member urge the belt to an equilibrium position on said second roll.

5. An apparatus for controlling the lateral alignment of a belt arranged to move in a predetermined path, comprising:
   a roll arranged to support a portion of the belt passing thereover, said roll having first and second ends;
   a first centering assembly for the belt, said first centering assembly being located adjacent said first end of said roll, said first centering assembly comprising:

a first roller, and
   a first resilient means for biasing said first roller in relation to said roll wherein said first resilient means comprises:
      a first spring located on a first end of said first roller, and
      a second spring located on a second end of said first roller, wherein both of said springs are compression springs; and,
   a second centering assembly for the belt, said second centering assembly being located adjacent said second end of said roll, said second centering assembly comprising:
      a second roller, and
      a second resilient means for biasing said second roller in relation to said roll.

6. The apparatus of claim 5 wherein said second resilient means comprises:
   a third spring located on a first end of said second roller; and,
   a fourth spring located on said second end of said second roller wherein both of said springs are compression springs.

7. The apparatus of claim 6 further comprising:
   a second roll having first and second ends;
   a third centering assembly located adjacent said first end of said second roll, said third centering assembly comprising:
      a third roller having first and second ends, and
      a sixth spring, wherein said fifth spring is located between said first end of said second roll and said first end of said third roller and said sixth spring is located on said second end of said third roller; and,
   a fourth centering assembly located adjacent said second end of said second roll, said fourth centering assembly comprising:
      a seventh spring,
      a fourth roller having first and second ends, and
      an eighth spring, wherein said seventh spring is located between said second end of said second roll and said first end of said fourth roller and said eighth spring is located on said second end of said fourth roller.

8. The apparatus of claim 7 further comprising a frame for supporting said first and second rollers and said first, second, third and fourth centering assemblies.

9. An electrophotographic printing machine of the type having an endless photoconductive belt arranged to move in a predetermined path through a plurality of processing stations disposed therealong, comprising:
   a roll arranged to support a portion of the belt passing thereover, said roll having first and second ends;
   a first centering assembly for the belt, said first centering assembly being located adjacent said first end of said roll, said first centering assembly comprising:
      a first spring,
      a first roller having first and second ends, said first roller being tapered such that it tapers toward said roll, and
      a second spring, wherein said first spring is located between said first end of said roll and said first end of said first roller and said second spring is located on said second end of said first roller; and,
   a second centering assembly for the belt, said second centering assembly being located adjacent said second end of said roll, said second centering assembly comprising:
      a third spring,
      a second roller having first and second ends, said first roller being tapered such that it tapers toward said roll, and
      a fourth spring, wherein said third spring is located between said second end of said roll and said first end of said second roller and said fourth spring is located on said second end of said second roller.

10. The apparatus of claim 9 further comprising a second roll having first and second ends.

11. The apparatus of claim 9 further comprising:
    a third centering assembly located adjacent said first end of said second roll, said third centering assembly comprising:
       a fifth spring,
       a third roller having first and second ends, said third roller being tapered such that it tapers toward said second roll, and
       a sixth spring, wherein said fifth spring is located between said first end of said second roll and said first end of said third roller and said sixth spring is located on said second end of said third roller; and,
    a fourth centering assembly located adjacent said second end of said second roll, said centering assembly comprising:
       a seventh spring,
       a fourth roller having first and second ends, said fourth roller being tapered such that it tapers toward said second roll, and
       an eighth spring, wherein said seventh spring is located between said second end of said second roll and said first end of said fourth roller and said eighth spring is located on said second end of said fourth roller.

12. The apparatus of claim 9 wherein said second roller comprises a drive roller for driving the belt.

13. The apparatus of claim 9 further comprising a frame for supporting said first and second rolls and said first, second, third and fourth centering assemblies.

14. An electrophotographic printing machine of the type having an endless photoconductive belt arranged to move in a predetermined path through a plurality of processing stations disposed therealong, comprising:
    a first roll arranged to support a portion of the belt passing thereover, said first roll having first and second ends;
    a second roll, spaced from said first roll, arranged to support a portion of the belt passing thereover, said second roll having first and second ends;
    a first centering assembly for the belt, said first centering assembly being located adjacent said first roll, said first centering assembly comprising:
       a first rotating member located adjacent said first end of said first roll, and
       a second rotating member located adjacent said second end of said first roll, wherein said first and second rotating members urge the belt to an equilibrium position;
    a second centering assembly for the belt, said second centering assembly being located adjacent said second roll, said second centering assembly comprising:
       a third rotating member located adjacent said first end of said second roll, and a fourth rotating member located adjacent said second end of said second roll, wherein said third and fourth rotating members urge the belt to an equilibrium position;

a frame which supports said first and second rolls and said first and second centering assemblies;

a first means for positively rotating said first and third rotating members; and, a second means for positively rotating said second and fourth rotating members.

15. The machine of claim 14 wherein said first and second rotating members comprise rollers.

16. The machine of claim 14 wherein said first and second rotating members each comprise:

an endless tracking belt; and, a first tracking belt system arranged to support the tracking belt passing thereover.

17. The machine of claim 16 wherein said tracking belt has a tapered shape in side view, tapering toward a side edge of the belt.

18. The machine of claim 17 wherein said tracking belt system for said first and second rotating members comprises at least one roller.

19. An apparatus for controlling the lateral alignment of a belt arranged to move in a predetermined path comprising:

a first roll arranged to support a portion of the belt passing thereover, said first roll having first and second ends;

a first centering assembly for the belt, said first centering assembly being located adjacent said first roll, said first centering assembly comprising:

a first rotating member located adjacent said first end of said first roll, a second rotating member located adjacent said second end of said first roll, wherein said first and second rotating members urge the belt to an equilibrium position on said first roll, and a means for positively rotating said first and second rotating member toward each other thereby urging the belt to an equilibrium position on said first roll.

20. The apparatus of claim 19 wherein said first rotating member comprises a roller.

21. The apparatus of claim 19 wherein said first rotating member comprises:

an endless tracking belt; and, a tracking belt system arranged to support the tracking belt passing thereover.

* * * * *